July 10, 1973     M. L. WILSON     3,744,972
NONDESTRUCTIVE SPOT TEST METHOD FOR MAGNESIUM AND MAGNESIUM ALLOYS
Filed July 16, 1971

```
[MAGNESIUM AND MAGNESIUM ALLOYS]
        │
[CLEAN A TEST SPOT]
        │
[PLACE SEVERAL DROPS OF 3M HYDROCHLORIC ACID ON THE METAL
 SURFACE, AFTER 30 SECONDS TRANSFER 2 DROPS OF THE REACTION
 SOLUTION TO EACH OF 2 DEPRESSIONS IN A SPOT PLATE]
        │
        ├──────────────────────────────────────────────┐
        │                                              │
[ADD 2 DROPS COBALTOUS SULFATE AND 2            [ADD 1 DROP ALIZARIN REAGENT
 DROPS ALKALI MERCURIC THIOCYANATE, STIR         AND OBSERVE AFTER 10 MINUTES]
 WITH A GLASS ROD FOR 15 SECONDS]                        │
        │                                                ├── [YELLOW COLOR SOLUTION]
        ├── [BLUE PRECIPITATE] ── [ZINC BEARING           │       │
        │                         MAGNESIUM ALLOY]        │   [ADD 1 DROP 6M AMMONIUM HYDROXIDE, STIR,
        │                                                 │    ADD DROPWISE 1M ACETIC ACID UNTIL COLOR
        └── [RED TO PURPLE PRECIPITATE]                   │    CHANGES, THEN ADD 1 DROP EXCESS]
                │                                         │       │
                ├── [ZIRCONIUM BEARING MAGNESIUM ALLOY]   │       ├── [ORANGE TO RED PRECIPITATE] ── [ALUMINUM BEARING
                │                                         │       │                                   MAGNESIUM ALLOY]
                └── [TEST METAL FOR RADIOACTIVITY]        │       │
                        │                                 │       └── [PURPLE COLOR] ── [SOME OTHER
                        ├── [RADIOACTIVE]                 │                               MAGNESIUM ALLOY]
                        │                                 │
                        └── [THORIUM BEARING              └── [PLACE SEVERAL DROPS 6M NITRIC ACID ON THE
                             MAGNESIUM ALLOY]                  CLEAN METAL SURFACE. AFTER 1 MIN. REACTION TRANSFER
                                                               1 DROP TO A SPOT PLATE, ADD 1 DROP WATER, 2 DROPS
                                                               1:1 SULFURIC ACID AND 2 DROPS SODIUM BISMUTHATE]
                                                                       │
                                                                       └── [A PINK COLOR] ── [MAGNESIUM BEARING
                                                                                              MAGNESIUM ALLOY]
```

*INVENTOR.*
MAYWOOD L. WILSON

BY

*Wallace J. Nelson*
ATTORNEYS

United States Patent Office 3,744,972
Patented July 10, 1973

3,744,972
NONDESTRUCTIVE SPOT TEST METHOD FOR MAGNESIUM AND MAGNESIUM ALLOYS
Maywood L. Wilson, Tabb, Va., assignor to the United States of America as represented by the Administrator of the National Aeronautics and Space Administration
Filed July 16, 1971, Ser. No. 163,152
Int. Cl. G01n 33/20, 21/06
U.S. Cl. 23—230 R                    7 Claims

ABSTRACT OF THE DISCLOSURE

A method for spot test identification of magnesium and various magnesium alloys commonly used in aerospace applications. The spot test identification involves color codes obtained when several drops of 3 M hydrochloric acid are placed on the surface to be tested, and after approximately thirty seconds, two drops of this reacted acid transferred to each of two depressions in a spot plate for additions of other chemicals with subsequent color changes indicating magnesium or the alloy thereof.

ORIGIN OF THE INVENTION

This invention was made by an employee of the National Aeronautics and Space Administration and may be manufactured and used by or for the Government of the United States of America for governmental purposes without the payment of any royalties thereon or therefor.

The invention relates to an improved spot test procedure to identify magnesium and various magnesium alloys commonly employed in aerospace applications. More particularly, the invention is related to a simple chemical spot test color developing when a magnesium or magnesium alloy specimen is treated with various chemicals.

The invention is particularly suited for use by shop and laboratory personnel having no special training in the field of chemistry with conclusions relative to identification being derived from unique reactions or colors being produced by the acid reactions.

To assure quality fabrication of hardware and maximum safety to personnel, it is necessary to identify or verify the various metals and alloys involved. That is, if two or more components are to be intelligently joined together by modern welding techniques, their positive identities are essential. Present facilities for the identification of various metals and alloys frequently require time-consuming procedures of chemical or spectrographic analyses.

It is therefore an object of the present invention to provide a new and novel nondestructive identification process for magnesium and magnesium alloys.

Another object of the present invention is a simple chemical test identification process for magnesium and magnesium alloys that can be performed by shop or laboratory personnel that have no special training in chemistry.

Another object of the present invention is a color spot test for identifying magnesium and magnesium alloys.

Another object of the present invention is a process for identifying the alloys in magnesium alloys.

A further object of the present invention is a semi-quantitative technique for various alloys contained in magnesium alloys.

The foregoing and other objects are attained by taking a metal known to be magnesium or a magnesium alloy, cleaning a small surface area thereon by use of a file, abrasive cloth or suitable solvent, placing several drops of 3 M hydrochloric acid on the clean surface, allowing it to react for thirty seconds and then transferring two drops of the reaction solution to each of two depressions in a spot plate for the addition of other chemical reactants. The colors obtained identify the test specimen as magnesium or one of its alloys. The color of the drop identifies the sample as magnesium or one of its alloys according to the color obtained. A standard chart containing the color code may be referred to for positive identification or the test may be conducted simultaneously on a sample of known composition.

A more complete appreciation of the present invention and many of the attendant advantages thereof will be readily appreciated as the same becomes better understood by reference to the following detailed description when considered in connection with the accompanying drawing wherein:

The single figure of the drawing is a flow sheet representing the process for differentiating and identifying magnesium and various magnesium alloys.

Referring to the figure, it is assumed that it is known that the particular sample to be tested and identified is known to be in the magnesium family, that is, magnesium or a specific magnesium alloy. A small test area on the specimen is then cleaned to remove any dirt, paint, grease, oxide or added metallic coating prior to performing the test. This cleaning process may involve the use of conventional cleaning solvents, files, abrasives, or the like. After proper cleaning the analyst should follow the chart in detail as set forth in the figure. Initially, several drops (six to eight) of 3 M hydrochloric acid is placed on the cleaned metal surface and allowed to react for thirty seconds. Two drops of the reaction solution is then transferred to each of two depressions in a spot plate.

To test for a zinc bearing magnesium alloy, two drops of cobaltous sulfate and two drops of alkali mercuric thiocyanate are added to one of the spot plate depressions and stirred with a glass rod for approximately fifteen seconds. A resulting blue precipitate confirms that the unknown test specimen is a zinc bearing magnesium alloy. The cobaltous sulfate employed in this test is prepared by dissolving 0.012 gram of cobaltous sulfate in 2.5 ml. of concentrated hydrochloric acid and diluting the solution to 60 ml. by the addition of distilled water. The alkali mercuric thiocyanate is prepared by dissolving 5.82 grams of mercuric chloride and 1.92 grams of ammonium thiocyanate in 60 ml. of distilled water. This solution is allowed to stand for several days before using.

To test for other magnesium alloys, one drop of alizarin reagent is added to the reaction solution in the other spot plate depression and allowed to react for ten minutes. A red-to-purple precipitate formed in the spot plate depression at this point indicates that the alloy is either a zirconium bearing magnesium alloy or a thorium bearing magnesium alloy. The test specimen is then tested for radioactivity by the use of a suitable Geiger counter, or the like, and if radioactive, it confirms that the test specimen is a thorium bearing magnesium alloy. The absence of radioactivity confirms that the test specimen is a zirconium bearing magnesium alloy. The alizarin reagent employed is prepared by dissolving 0.06 gram of the Alizarin Red S (Allied Chemical Corporation, National Aniline Division, 40 Rector St., New York 6, N.Y.) in 60 ml. of distilled water.

When no precipitate is formed after the ten minute reaction of the alizarin reagent the spot plate depression will contain a clear yellow solution. One drop of 6 M ammonium hydroxide is added to this solution and stirred with a gloss rod while adding dropwise 1 M acetic acid until the color changes and one drop excess of the acetic acid added. An orange-ro-red precipitate formed at this point indicates that the unknown test specimen is an aluminum bearing magnesium alloy. A purple color at this point indicates some other magnesium alloy. This is tested by placing several drops of 6 M nitric acid on the clean surface of the unknown and allowing it to react for one minute before transferring one drop thereof to a clean spot plate depression. One drop of water, two drops of 1:1 sulfuric acid and two drops of sodium bismuthate are then added to the acid drop and the color change observed. A resulting pink color confirms that the unknown test specimen is a manganese bearing magnesium alloy.

The above described tests are normally sufficient to positively identify the magnesium alloys; however, additional color spot tests have been developed to identify specific metals alloyed with magnesium. For example, one test for aluminum alloyed with magnesium would be as follows: (a) place several drops of 3 M hydrochloric acid on the cleaned test specimen surface and, after one minute, transfer two drops of the reacted acid to a spot plate depression; (b) add one drop of alizarin reagent (prepared as described hereinbefore) and stir with a glass rod; (c) add one drop of 6 M ammonium hydroxide and stir with a glass rod; (d) add dropwise 1 M acetic acid until a color change is visible and then add one drop excess. An orange-to-red precipitate formed at this point confirms the presence of aluminum. If no aluminum is present no precipitate will be formed and the solution remains a pale yellow. If the orange-to-red precipitate is formed, a semi-quantitative determination of the aluminum can be obtained by comparing the intensity of the color obtaind with a color chart indicating the color intensity for magnesium alloys having known aluminum contents. Alternatively, a known sample can be tested simultaneously with the unknown and the color intensity comparison made.

Another test for aluminum alloyed with magnesium is as follows: (a) transfer five drops of the acid solution, formed by the one minute reaction of several drops of 6 M acetic acid on the cleaned surface of the test specimen, to a small test tube; (b) add five drops of 3 M ammonium acetate and two drops of alizarin reagent; (c) add five drops of 6 M ammonium hydroxide and stir with a glass rod; (d) let stand one minute and centrifuge for approximately five minutes at 1725 r.p.m. An orange-to-red gelatinous precipitate confirms the presence of aluminum with the color intensity being indicative of the aluminum content.

A third test for aluminum alloyed with magnesium is as follows: (a) to five drops of the acid solution, formed by the one minute reaction of several drops of 6 M acetic acid on the clean test specimen surface and placed in a small test tube, add five drops of 3 M ammonium acetate and two drops of aluminon reagent (formed by dissolving 0.06 gram of aluminon in 60 ml. distilled water); (b) add five drops of 6 M ammonium hydroxide and stir with a glass rod; (c) let stand for one minute and centrifuge for approximately five minutes at 1725 r.p.m. A pink-to-red gelatinous precipitate confirms the presence of aluminum.

To test for manganese alloyed with magnesium, several drops of 6 M nitric acid are placed on a cleaned surface of the test specimen, allowed to react for one minute and one drop of the reacted acid transferred to a spot plate depression. One drop of distilled water, followed by two drops of 1:1 sulfuric acid and two drops of a sodium bismuthate solution are then added to the spot plate depression and a resulting pink-to-purple color identifies the presence of manganese. The intensity of the color obtained is proportional to the content of manganese. The sodium bismuthate solution is prepared by dissolving 3.5 grams of the dry powder sodium bismuthate in 60 ml. of distilled water.

To test for zinc alloyed with magnesium several drops of 3 M hydrochloric acid are allowed to react for one minute on the cleaned surface of the test specimen before transferring two drops of the reacted acid to a spot plate depression. Two drops of cobaltous sulfate solution followed by two drops of alkali mercuric thiocyanate are then added to the spot plate depression and the contents stirred for approximately fifteen seconds taking care to rub the sides of the depression while stirring. A blue precipitate confirms the presence of zinc with the intensity of the color and the quantity of the precipitate being proportional to the zinc content. Magnesium alloys containing three percent and one percent zinc are easily differentiated by this method. The cobaltous sulfate solution employed in this test is prepared by dissolving 0.012 gram of cobaltous sulfate in 2.5 ml. of concentrated hydrochloric acid and, thereafter, diluting with distilled water to 60 ml. The alkali mercuric thiocyanate is prepared by dissolving 5.82 grams of mercuric chloride and 1.92 grams of ammonium thiocyanate in 60 ml. of distilled water with the solution being allowed to stand for several days before using.

To test for zirconium alloyed with magnesium several drops of 3 M hydrochloric acid are allowed to react on the cleaned surface of the test specimen for one minute before transferring two drops of the reacted acid to a spot plate depression. One drop of alizarin reagent is then added to the spot plate depression and the combined solutions allowed to stand for approximately ten minutes. A resulting red-to-purple precipitate identifies the presence of zirconium. The alizarin reagent employed in this test is prepared by dissolving 0.06 gram of Alizarin S in 60 ml. of distilled water.

The advantages of the present invention and its ease of adaptation for use by shop and laboratory personnel having no special training in chemistry are now believed apparent. The conclusions relative to identification are derived from unique reactions or the colors produced by the addition of the various reagents and the colors obtained may be readily compared with standardized color charts prepared from known metal tests. The various tests decribed herein are nondestructive in that they are conducted on the metal surface and the material affected is equivalent to the stroke of a smooth file or cleaning with an abrasive cloth. Although the tests are intended primarily as qualitative, semiquantitative conclusions in most instances are readily made by comparison with standardized color charts, simultaneously testing specimens having known chemical compositions and by comparing the relative quantity of precipitates produced or the intensities of the color reactions.

Although the procedures and process steps described in the various tests described herein have been enumerated in detail, the invention is not so limited and there are many variations and modifications of the procedures that will be readily apparent to those skilled in the art in the light of the above teachings. It is therefore to be understood that the invention may be practiced otherwise than as specifically described.

What is claimed as new and desired to be secured by Letters Patent of the United States is:

1. A method for nondestructive spot testing a magnesium alloy for the presence of aluminum, comprising:
   (a) cleaning a test spot on the unknown magnesium alloy specimen to remove any dirt, paint, grease, oxide or added metallic coating by use of a cleaning solvent, file, abrasive or the like,
   (b) placing several drops of 3 M hydrochloric acid on the clean metal surface of the specimen,
   (c) after one minute transferring two drops of the reaction solution to a spot plate depression,
   (d) adding to the spot plate depression one drop of an alizarin reagent, prepared by dissolving 0.06 gram of Alizarin Red S in 60 ml. of distilled water,
   (e) adding one drop of 6 M ammonium hydroxide and stirring with a glass rod,
   (f) adding dropwise 1 M acetic acid until a color change is visible and then adding one drop in excess, whereby an orange-to-red precipitate indicates the presence of aluminum alloyed with the magnesium while if no aluminum is present to react with the acidified solution of alizarin, the solution in the spot plate depression turns yellow.

2. The method of claim 1 and further including a semiquantitative test for aluminum wherein the intensity of the orange-to-red color is indicative of the aluminum present in the alloy and further comparing the color obtained in the spot plate depression with the color of known aluminum alloys in magnesium as found on a standardized color chart.

3. A method of nondestructive spot testing a magnesium alloy for the presence of aluminum comprising:
   (a) cleaning a test spot on the magnesium alloy specimen by use of a cleaning solvent, file, abrasive or the like to remove any dirt, paint, grease, oxide or added metallic coating from the alloy,
   (b) placing several drops of 6 M acetic acid on the cleaned spot and allowing it to react for one minute,
   (c) transferring five drops of the reacted acid to a small test tube,
   (d) adding five drops of 3 M ammonium acetate and two drops of alizarin reagent to the test tube,
   (e) adding five drops of 6 M ammonium hydroxide and stirring with a glass rod, let stand for one minute and centrifuge at 1725 r.p.m. for approximately five minutes,
whereby an orange-to-red gelatinous precipitate confirms the presence of aluminum and the color intensity and quantity of the orange-to-red precipitate is proportional to the aluminum content of the alloy.

4. A method of nondestructive spot testing a magnesium alloy for the presence of aluminum comprising:
   (a) cleaning a test spot on the magnesium alloy specimen by use of a cleaning solvent, file, abrasive or the like to remove any dirt, paint, grease, oxide or added metallic coating from the alloy,
   (b) placing several drops of a 6 M acetic acid solution on the cleaned test spot and allowing it to react for one minute,
   (c) transferring five drops of the reacted acid to a small test tube, adding five drops of 3 M ammonium acetate,
   (d) adding two drops of aluminon reagent to the test tube, said aluminon reagent being prepared by dissolving 0.06 gram of aluminon in 60 ml. of distilled water,
   (e) adding five drops of 6 M ammonium hydroxide, and stir with a glass rod,
   (f) let stand for one minute and centrifuge for approximately five minutes at 1725 r.p.m.,
whereby, a pink-to-red precipitate confirms that aluminum is present in the alloy and the intensity of the pink-to-red color and the quantity of precipitate is proportional to the aluminum content.

5. A method of nondestructive spot testing a magnesium alloy for the presence of manganese comprising:
   (a) cleaning a spot on the magnesium alloy to remove any foreign material on the alloy,
   (b) placing several drops of 6 M nitric acid on the cleaned metal surface,
   (c) after one minute reaction time, transfer one drop of the reacted acid to a spot plate depression,
   (d) add one drop of distilled water, two drops of 1:1 sulfuric acid and two drops of sodium bismuthate solution to the spot plate depression, said sodium bismuthate solution being prepared by dissolving 3.5 grams of sodium bismuthate to 60 ml. distilled water,
whereby a pink-to-purple color identifies the presence of manganese and the intensity of the color is proportional to the manganese content.

6. A method of nondestructive spot testing a magnesium alloy for the presence of zinc comprising:
   (a) cleaning a test spot on the magnesium alloy to remove any foreign material on the alloy,
   (b) adding several drops of 3 M hydrochloric acid to the cleaned surface,
   (c) after one minute, transfer two drops of the reacted acid to a spot plate depression,
   (d) add two drops of cobaltous surface solution and two drops of alkali mercuric thiocyanate to the spot plate depression, said cobaltous sulfate solution being prepared by dissolving 0.012 gram of cobaltous sulfate in 2.5 ml. concentrated hydrochloric acid and diluted to 60 ml. with distilled water and said alkali mercuric thiocyanate being prepared by dissolving 5.82 grams of mercuric chloride and 1.92 grams of ammonium thiocyanate in 60 ml. distilled water and allowing the solution to stand for several days before using,
   (e) stirring the spot plate depression contents with a glass rod taking care to rub the sides thereof,
whereby a blue precipitate confirms the presence of zinc with the color intensity and quantity of the precipitate formed being proportional to the zinc content.

7. A method of nondestructive spot testing a magnesium alloy for the presence of zirconium, comprising:
   (a) cleaning a test spot on the test specimen to remove any foreign material on the alloy,
   (b) placing six-to-eight drops of 3 M hydrochloric acid to the cleaned surface and allowing the acid to react for one minute,
   (c) transferring two drops of the reacted acid to a spot plate depression,
   (d) adding one drop of alizarin reagent to the spot plate and allowing it to react for ten minutes, said alizarin reagent being prepared by dissolving 0.06 gram of Alizarin S in 60 ml. of distilled water,
whereby, a red-to-blue precipitate confirms the presence of zirconium and the intensity of the color and the quantity of precipitate obtained is indicative of the amount of zirconium present in the alloy.

References Cited

Papucci et al.: "Determination of Zirconium in Magnesium Alloys by Using p-Bromo or p-Chloro-Mandelic Acid," Anal. Abs., vol. 2, 3017, 1955.

Tananev et al.: "Determination of Aluminum in Magnesium Alloys by the Surface Treatment Method," Anal. Abs., vol. 7, 1302, 1960.

Tikhonov: "Determination of Zirconium in Magnesium Alloys by Surface Treatment," Anal. Abs., vol. 10, 2612, 1963.

MORRIS O. WOLK, Primary Examiner

R. E. SERWIN, Assistant Examiner